United States Patent
Lee

(10) Patent No.: US 7,088,588 B2
(45) Date of Patent: Aug. 8, 2006

(54) COUPLING STRUCTURE

(75) Inventor: Chiu-Chih Lee, Taipei (TW)

(73) Assignee: Uniwill Computer Corp., Taoyuan Hsien (TW)

( * ) Notice: Subject to any disclaimer, the term of this patent is extended or adjusted under 35 U.S.C. 154(b) by 250 days.

(21) Appl. No.: 10/753,471

(22) Filed: Jan. 9, 2004

(65) Prior Publication Data

US 2005/0152120 A1    Jul. 14, 2005

(51) Int. Cl.
*H05K 7/00* (2006.01)
*G06F 1/16* (2006.01)

(52) U.S. Cl. .................. 361/725; 341/22; 292/108; 358/474

(58) Field of Classification Search ........ 361/679–687, 361/724–727; 341/22; 292/102, 106, 108; 358/474
See application file for complete search history.

(56) References Cited

U.S. PATENT DOCUMENTS

| | | | | |
|---|---|---|---|---|
| 6,108,196 A | * | 8/2000 | Jung | 361/683 |
| 6,839,225 B1 | * | 1/2005 | Chou | 361/680 |
| 2005/0168924 A1 | * | 8/2005 | Wu | 361/683 |

* cited by examiner

*Primary Examiner*—Hung Van Duong
(74) *Attorney, Agent, or Firm*—Alan D. Kamrath; Nikolai & Mersereau, P.A.

(57) ABSTRACT

A coupling structure includes a hook bar and a force receiving member adopted for use on an electronic device that has a folding member such as a notebook computer that consists of an upper lid and a base. The folding member is the upper lid. The force receiving member and the hook bar have respectively a portion exposed from two neighboring sides of the upper lid, and are coupled by a turning mechanism. When the force receiving member is depressed, it is moved longitudinally towards the upper lid. The turning mechanism transfers the force to push the hook bar moving transversely so that the latch tenons on the hook bar may escape the latch holes on the base to control the coupling condition.

4 Claims, 6 Drawing Sheets

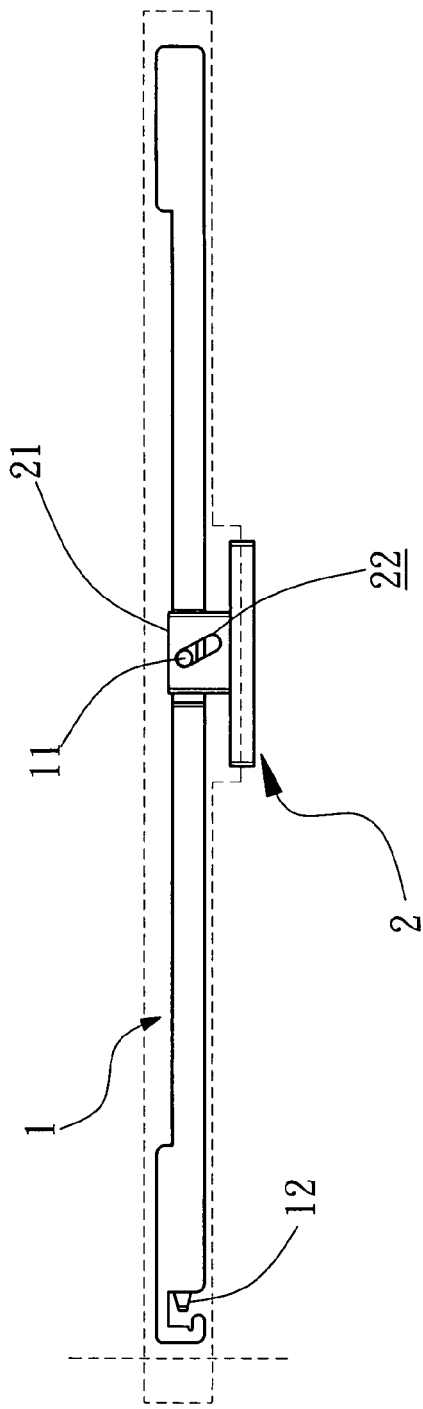
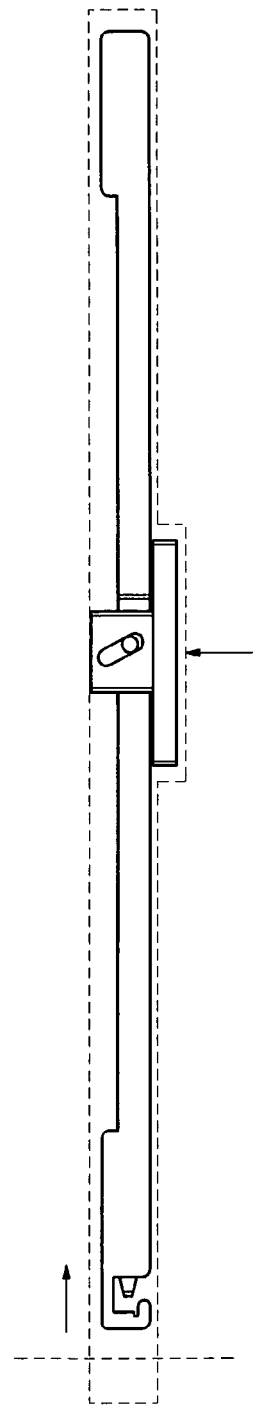
Fig. 4A
Fig. 4B

COUPLING STRUCTURE

BACKGROUND OF THE INVENTION

Field of the Invention

The present invention relates to a coupling structure adopted for use on electronic devices that have a folding member and particularly to a coupling structure that controls the coupling condition of the folding member by depressing.

Conventional electronic devices that have a folding member such as notebook computers generally include an upper lid and a base. And a coupling structure is used to anchor the folding member. The coupling structures usually can be divided into a transverse push latch structure and a depressing latch structure.

Refer to FIG. 1 for a conventional transverse latch structure. It mainly includes a hook bar A1 fastening to a force receiving member A2 that are located in an upper lid A3. The hook bar A1 is housed in a transverse trough A31 formed in the upper lid A3 and may be moved reciprocally therein. When the upper lid A3 is folding over a base A4, the latch tenon A12 located at the bottom of the hook bar A1 is latched in a latch hole A41 of the base A4. And an elastic element A34 will push the latch tenon A12 to maintain a coupling condition with the latch hole A41. To open the upper lid A3, move the force receiving member A2 transversely to push the hook bar A1, the latch tenon A12 will escape the latch hole A41 to release the coupling condition between the latch tenon A12 and the latch hole A41.

Another type of the conventional coupling structure is the depressing latch structure (not shown in the drawings). It mainly includes a latch hook fastening to a force receiving member, and are located in a trough in the upper lid and movable therein longitudinally. When the upper lid is folding over the base, an elastic element will keep the latch hook on a position where a latch tenon is located to latch in a corresponding latch hole formed in the base. To open the upper lid, directly depress the force receiving member with a longitudinal force to push the latch hook, the latch tenon will be moved away from the latch hole, and the coupling condition will be released.

In the transverse latch structure mentioned above the force receiving member receives a transverse force which is in a different direction against the opening direction of the upper lid, operation is not convenient. Moreover, the surface of the force receiving member should have slip-proof traces. This creates appearance and fabrication problems. On the other hand, the depressing latch structure should has a longitudinal force applying on the force receiving member so that it can be moved away from the latch hole of the base in the longitudinal direction along the upper lid. Such a latch structure takes more longitudinal space of the upper lid and affects the installation of LCD panel or increases the dimension of the upper lid. The present invention aims to overcome the problems occurred to the conventional coupling structures set forth above.

SUMMARY OF THE INVENTION

The primary object of the invention is to resolve aforesaid disadvantages. The invention mainly includes a hook bar and a force receiving member. The electronic device with a folding member includes an upper lid and a base. The hook bar and the force receiving member are located in a trough formed in the upper lid. The hook bar and the force receiving member are coupled by a turning mechanism. When the force receiving member is depressed by an external force, it is moved in the longitudinal direction towards the upper lid. But the hook bar may be pushed transversely through the turning mechanism to enable the latch tenon to escape the latch hole of the base to release the coupling.

By means of coupling structure of the invention, the following functions and effects may be achieved:

1. The coupling structure of the invention has a turning mechanism that can alter force applying direction to enable the hook bar to generate a transverse movement through the compression type force receiving member.
2. The coupling structure of the invention adopts depressing approach to apply force. Its operation is more convenient. It does no need a slip-proof surface on the force receiving member. Thus it can reduce fabrication complexity of the elements.
3. The coupling structure of the invention requires a smaller depth in the upper lid for installation. It does not affect the installation of LCD panel, and can reduce the dimension of the upper lid.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 4A is a top view according to FIG. 4.

FIG. 4B is a top view according to FIG. 4A after moved.

DESCRIPTION OF THE PREFERRED EMBODIMENTS

Figure 1:
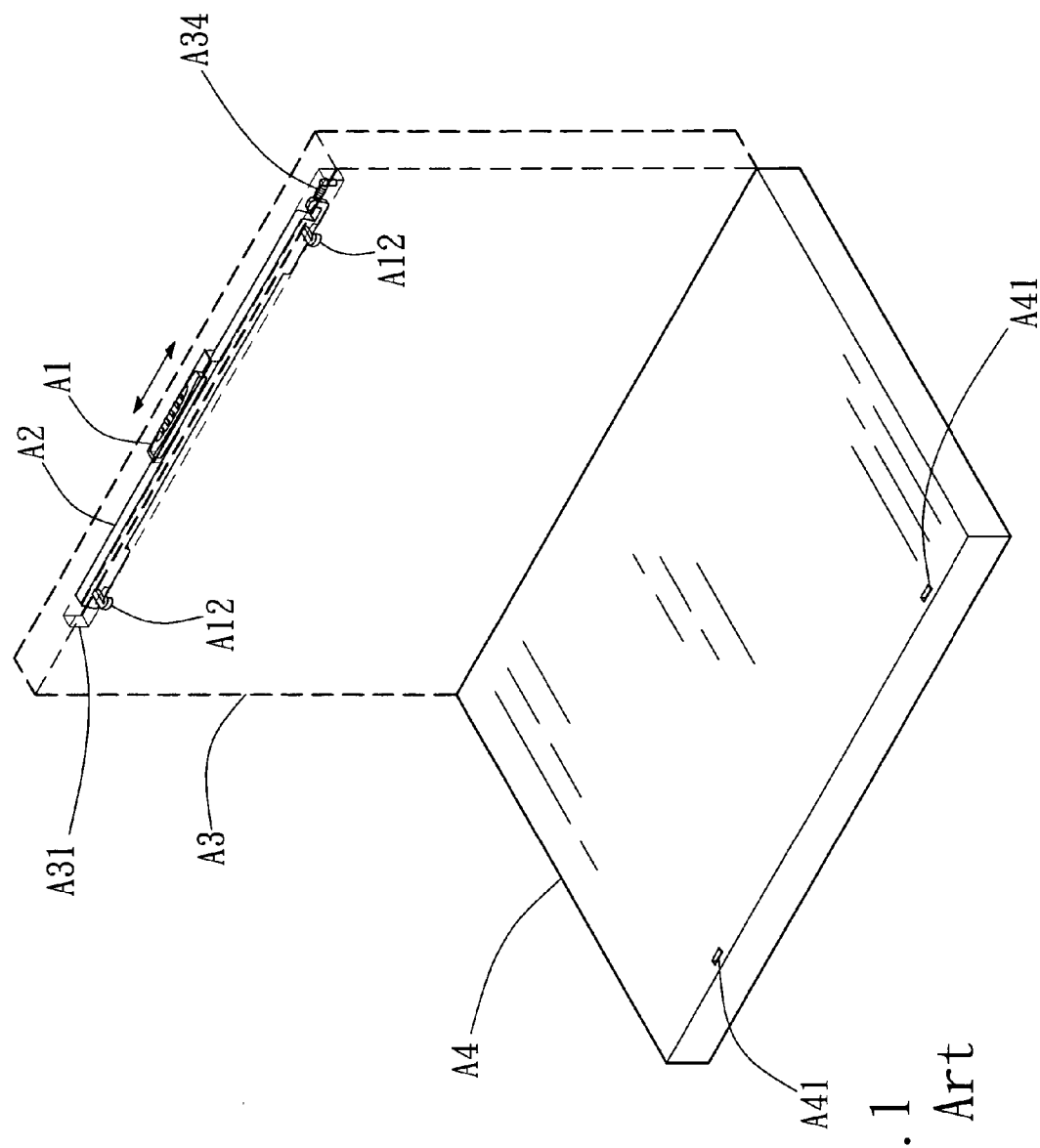
FIG. 1 is a perspective view of a conventional coupling structure.
Figure 2:
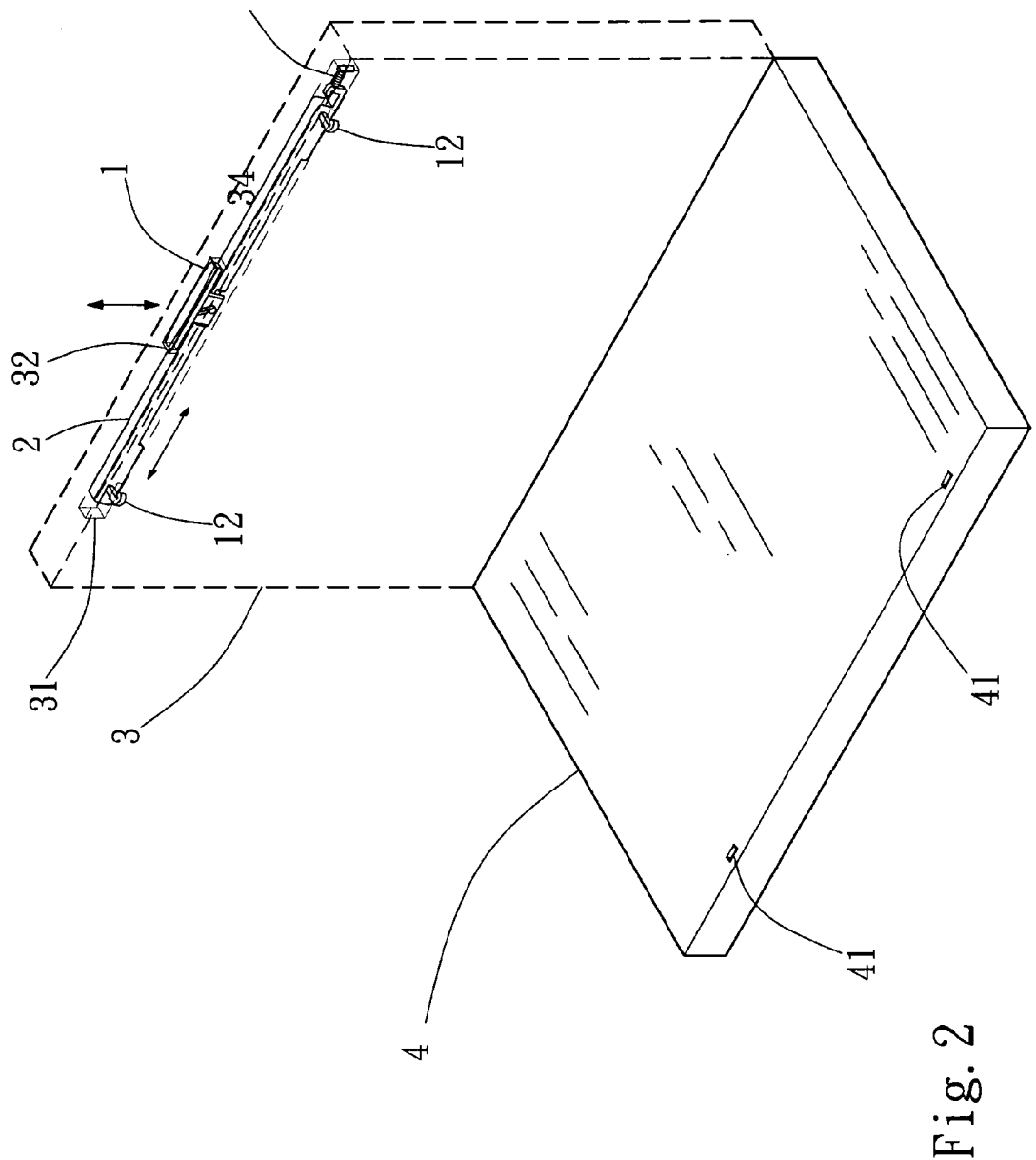
FIG. 2 is a perspective view of the coupling structure of invention with an upper lid matching a base.
Figure 3:
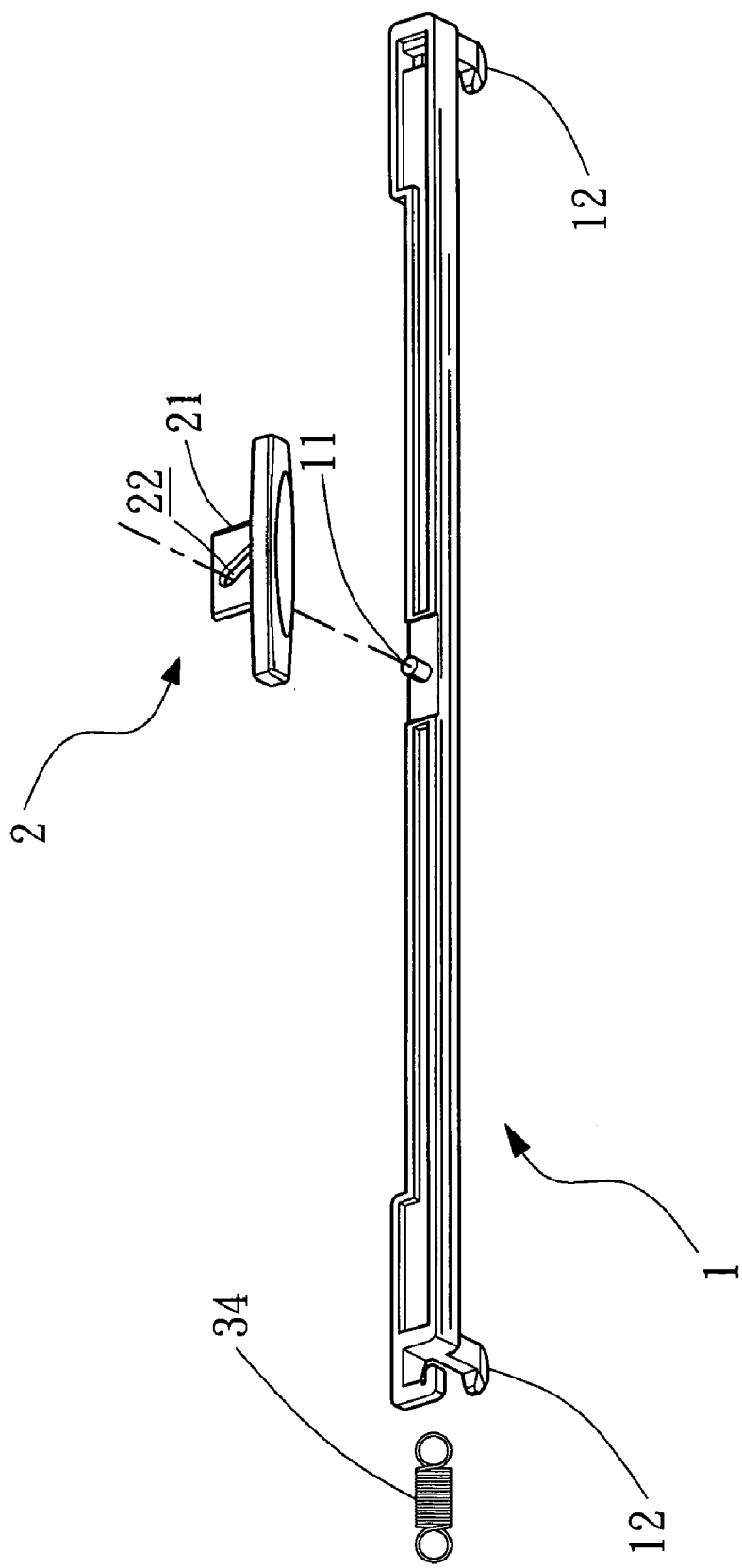
FIG. 3 is an exploded view of an embodiment of the invention.

Refer to FIGS. 2, 3, 4A and 4B for an embodiment of the coupling structure of the invention that is adopted for use on an electronic device which has a folding member. The invention mainly includes a hook bar 1 and a force receiving member 2. The hook bar 1 and the force receiving member 2 are coupled by a turning mechanism. The turning mechanism includes a compression section 22 and a driven section 11. The electronic device with a folding member such as a notebook computer includes an upper lid 3 and a base 4. The hook bar 1 and the force receiving member 2 are located respectively in a first trough 31 and a second trough 32 formed in the upper lid 3, and mate the base 4 so that the upper lid 3 may be latched and coupled on the base 4.

The hook bar 1 is a rod which has a top side extending upwards to form the driven section 11 of the turning mechanism. The driven section 11 is a strut. The hook bar 1 has a bottom side extending downwards to form two latch tenons 12.

The force receiving member 2 is a plate 21 extending vertically rewards. The plate 21 contains the compression section 22 which is a slot running through the plate. The compression section 22 is an elongated slot extending in a biased angle relative to the extending direction of the plate 21. The size of the compression section 22 mates the driven section 11 of the hook bar 1 that may be wedged in the slot.

The upper lid 3 is a panel pivotally coupled on one side of the base 4. The first trough 31 and the second trough 32 are formed on one side of the upper lid 3. The first trough 31 is in parallel with one side of the upper lid 3 for housing the hook bar 1 and confines the hook bar 1 to move therein. The second trough 32 is normal to the first trough 31 and runs trough outwards to house the force receiving member 2 and confines the force receiving member 2 to move therein. The first trough 31 has a bottom forming two apertures 33 running through the upper lid 3 and corresponding to the two latch tenons 12 of the hook bar 1. The first trough 31 has one end coupling with an elastic element 34 which provides the hook bar 1 a transverse elastic returning force.

The base 4 has two latch holes 41 corresponding to the apertures 33 of the upper lid 3. Each latch hole 41 mates the latch tenon 12 for coupling with each other.

In this embodiment. The hook bar 1 is movably located in the first trough 31 of the upper lid 3. The latch tenon 12 runs through the aperture 33 of the upper lid 3. The elastic element 34 provides a transverse returning elastic force to the hook bar 1. The force receiving member 2 is located in the second trough 32 of the upper lid 3. The compression section 22 of the plate 21 is coupled with the driven section 11 of the hook bar 1 and confined in second trough 32 of the upper lid 3.

When the upper lid 3 is folded and closed over the base 4, the elastic element 34 provides an elastic force to keep the hook bar 1 at a selected position so that the latch tenon 12 is latched in the latch hole 41 of the base 4. To open the upper lid 3, depress the force receiving member 2 to move the plate 21 forwards along the second trough 32. As the compression section 22 is a biased slot formed in the forward direction of the second trough 32, the longitudinal force applied on the force receiving member 2 is transformed to a transverse force pushing the hook bar 1 and driving the driven section 11 of the hook bar 1. Therefore the hook bar 1 is driven to move along the first trough 31 to allow the latch tenon 12 to escape the latch hole 41 of the base 4 to release the coupling condition.

Figure 5:
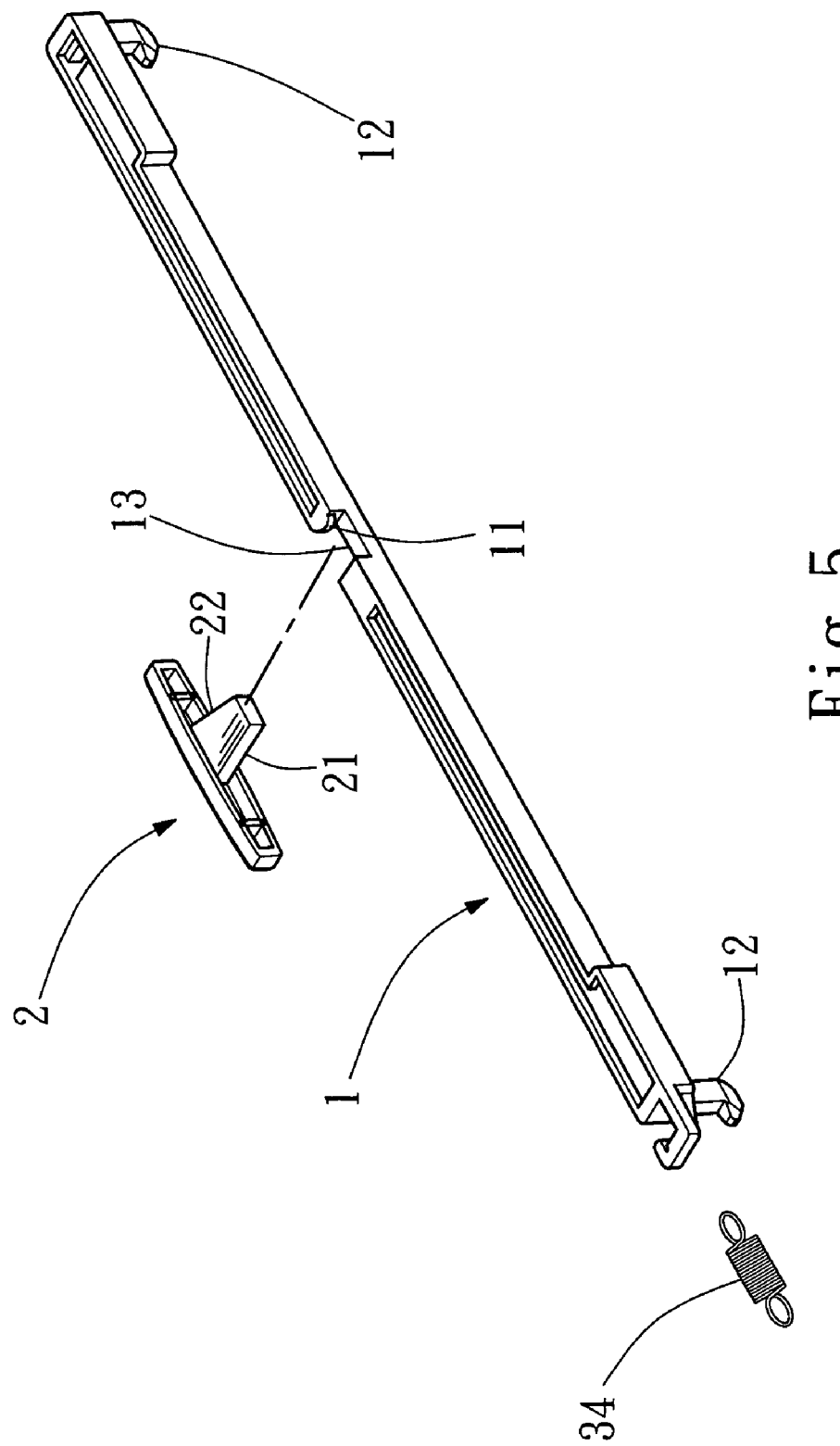
FIG. 5 is an exploded view of another embodiment of the invention.
Figure 6A:
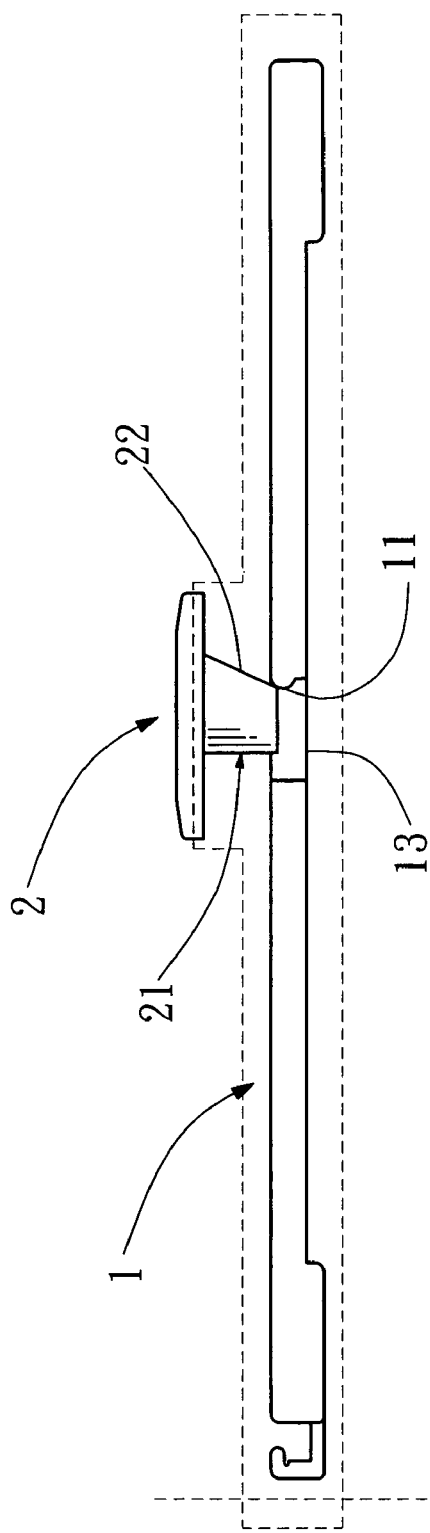
FIG. 6A is a top view according to FIG. 6.
Figure 6B:
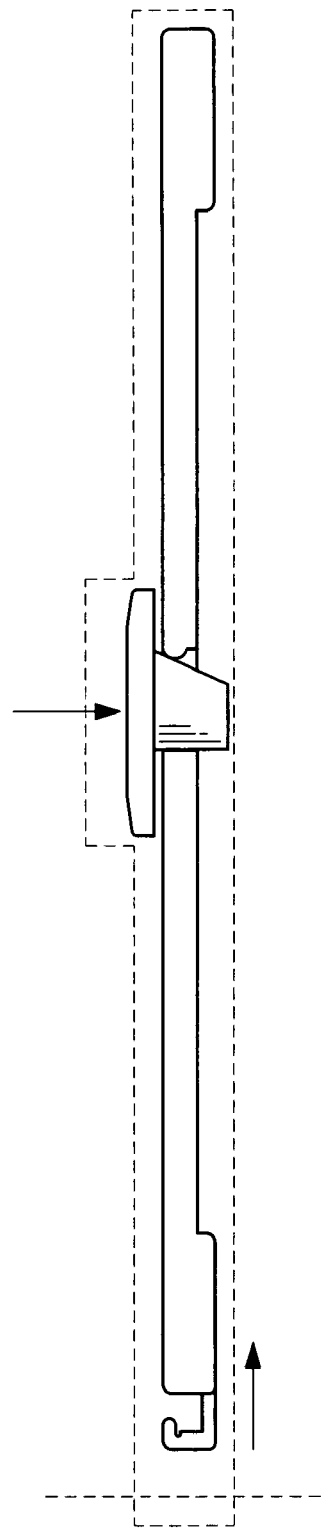
FIG. 6B is a top view according to FIG. 6A after moved.

Refer to FIGS. 5, 6A and 6B for another embodiment of the invention. It mainly includes a hook bar 1 and a force receiving member 2. The hook bar 1 and the force receiving member 2 are coupled by a turning mechanism. The turning mechanism includes a compression section 22 and a driven section 11. The electronic device with a folding member such as a notebook computer includes an upper lid 3 and a base 4. The hook bar 1 and the force receiving member 2 are located respectively in a first trough 31 and a second trough 32 formed in the upper lid 3, and mate the base 4 so that the upper lid 3 may be latched and coupled on the base 4.

The hook bar 1 is a rod which has a top side forming an indented trough 13 and a bottom side extending downwards to form two latch tenons 12. The indented trough 13 has one side forming a driven section 11 which is an arched lug extending outwards.

The force receiving member 2 is a plate 21 extending vertically rewards. The plate 21 contains the compression section 22 which is a sloped surface. The compression section 22 mates the driven section 11 of the indented trough 13 of the hook bar 1. The width of the indented trough 13 also matches the maximum width of the plate 21.

The upper lid 3 is a panel pivotally coupled on one side of the base 4. The first trough 31 and the second trough 32 are formed on one side of the upper lid 3. The first trough 31 is in parallel with one side of the upper lid 3 for housing the hook bar 1 and confines the hook bar 1 to move therein. The second trough 32 is normal to the first trough 31 and runs trough outwards to house the force receiving member 2 and confines the force receiving member 2 to move therein. The first trough 31 has a bottom forming two apertures 33 running through the upper lid 3 and corresponding to the two latch tenons 12 of the hook bar 1. The first trough 31 has one end coupling with an elastic element 34 which provides the hook bar 1 a transverse elastic returning force.

The base 4 has two latch holes 41 corresponding to the apertures 33 of the upper lid 3. Each latch hole 41 mates the latch tenon 12 for coupling with each other.

In this embodiment. The hook bar 1 is movably located in the first trough 31 of the upper lid 3. The latch tenon 12 runs through the aperture 33 of the upper lid 3. The elastic element 34 provides a transverse returning elastic force to the hook bar 1. The force receiving member 2 is located in the second trough 32 of the upper lid 3. The compression section 22 of the plate 21 is in contact with the driven section 11 of the hook bar 1 and confined in the second trough 32 of the upper lid 3.

When the upper lid 3 is folded and closed over the base 4, the elastic element 34 provides an elastic force to keep the hook bar 1 at a selected position so that the latch tenon 12 is latched in the corresponding latch hole 41 of the base 4. To open the upper lid 3, depress the force receiving member 2 to move the plate 21 forwards along the second trough 32. As the compression section 22 is a biased towards the forward direction of the second trough 32, the driven section 11 of the hook bar 1 will be driven. Therefore the hook bar 1 is moved along the first trough 31 to allow the latch tenon 12 to escape the latch hole 41 of the base 4 to release the coupling condition.

The upper lid 3 and the base 4 form the main body of a notebook computer. LCD panel is installed on the upper lid 3, while the base 4 forms the case of the computer host.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A coupling structure adopted for use on electronic devices having a folding member, comprising:
   a force receiving member located in the folding member having a portion exposed from one side of the folding member and movable reciprocally in only one direction;
   a hook bar located in the folding member having a portion exposed from another side of the folding member abutting the one side of the folding member, where the force receiving member is exposed and is movable reciprocally only in one direction; and
   a turning mechanism for coupling the force receiving member and the hook bar including a compression section and a driven section formed respectively on the force receiving member and the hook bar, wherein a longitudinal force applying to the force receiving member is transferred through the compression section and the driven section to become a transverse force for driving the hook bar, wherein the compression section of the turning mechanism is a sloped surface, and wherein the driven section of the turning mechanism is a jutting arched lug in contact with the sloped surface so that the arched lug forms a biased angle against the moving direction of the force receiving member.

2. The coupling structure of claim 1, wherein the compression section of the turning mechanism is a slot which forms a biased angle against the moving direction of the force receiving member.

3. The coupling structure of claim 2, wherein the driven section of the turning mechanism is a strut wedging in the slot of the force receiving member.

4. The coupling structure of claim 1, wherein the hook bar is coupled with an elastic element to return the hook bar to a selected location when the force applying to the force receiving member is absent.

* * * * *